April 17, 1928.  1,666,643

M. EDELMAN

CUTTING MACHINE

Filed Sept. 25, 1926   3 Sheets-Sheet 1

INVENTOR:
Max Edelman.
BY
ATTORNEYS.

April 17, 1928.  1,666,643
M. EDELMAN
CUTTING MACHINE
Filed Sept. 25, 1926   3 Sheets-Sheet 2
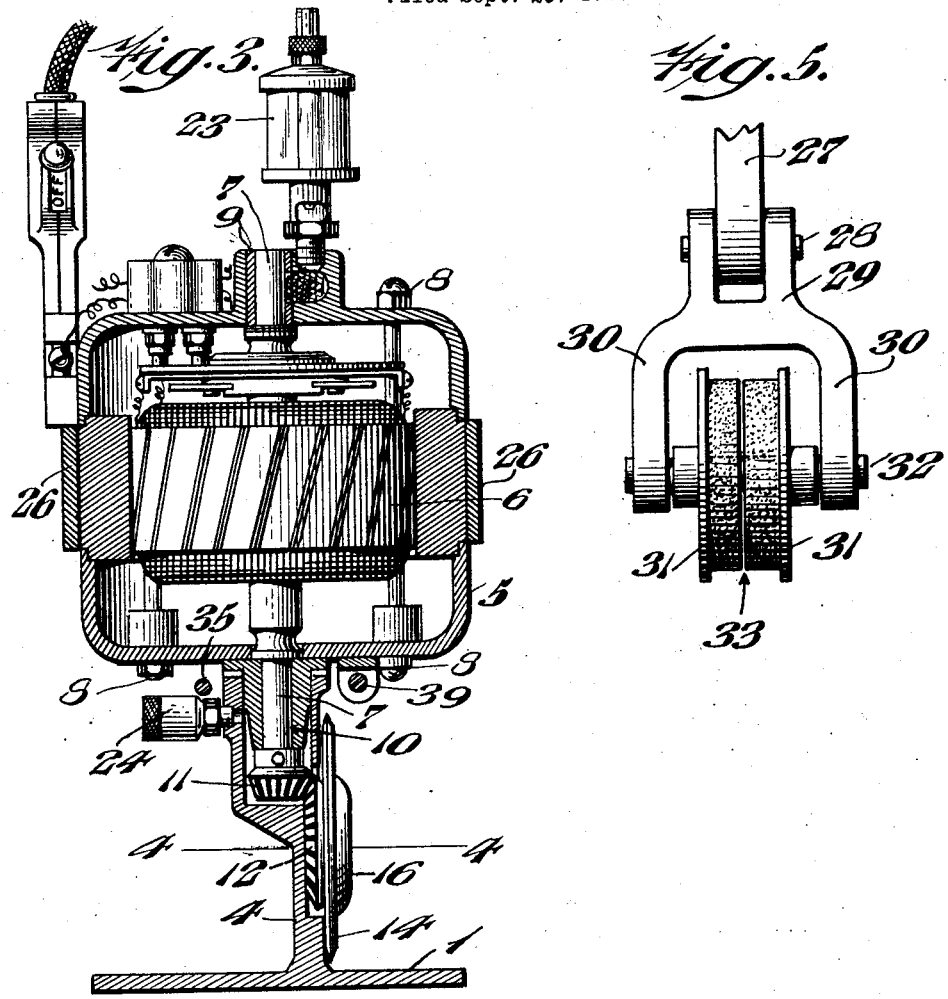
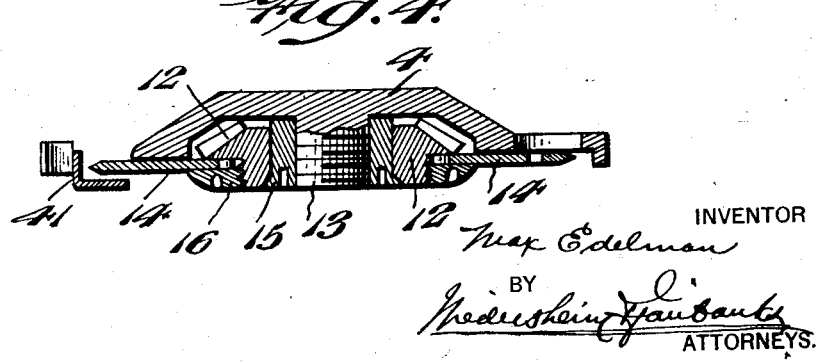
INVENTOR
Max Edelman
BY
ATTORNEYS.

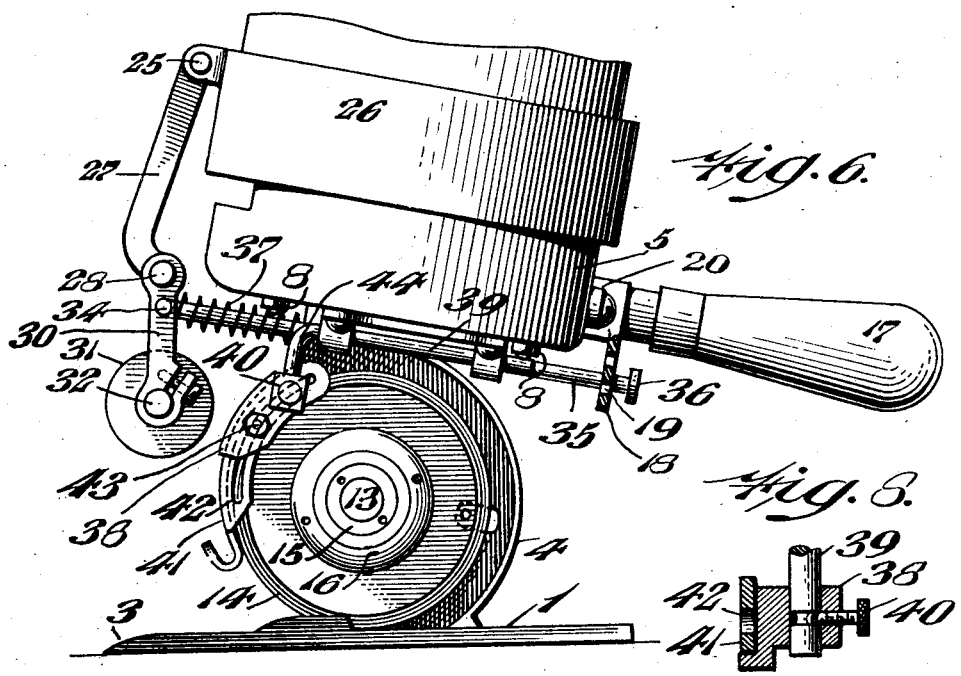
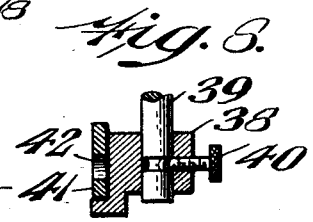
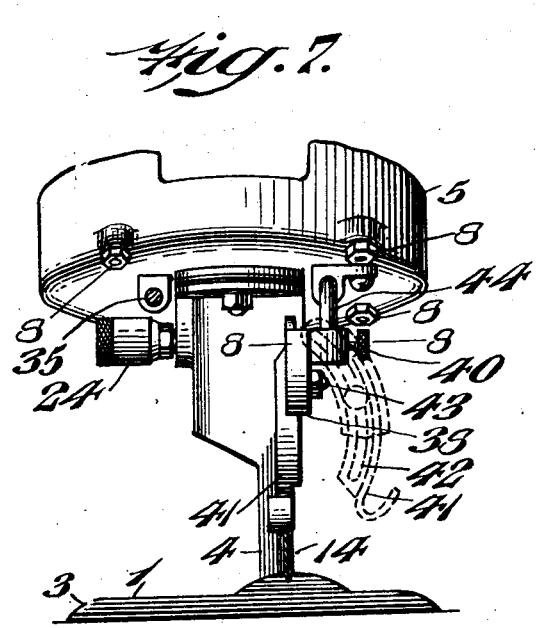
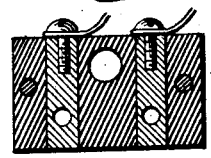
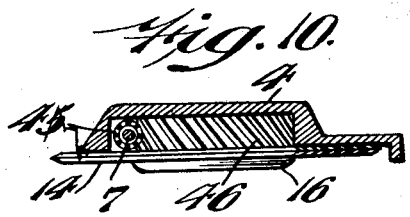

Patented Apr. 17, 1928.

1,666,643

UNITED STATES PATENT OFFICE.

MAX EDELMAN, OF SELLERSVILLE, PENNSYLVANIA, ASSIGNOR TO ESTHER M. SHAPIRO, OF SELLERSVILLE, PENNSYLVANIA.

CUTTING MACHINE.

Application filed September 25, 1926. Serial No. 137,749.

The leading object of the present invention is to provide a simple, efficient and comparatively inexpensive cutting machine of the character stated in which, first, is employed a rotary cutter sharpening device which is manually operated under spring tension and about its pivot point for presentation to and withdrawal from the rotary cutter.

A further object of the present invention is to provide a semi-circular guard movable laterally with respect to the motor casing which may be moved toward or away from the face of the rotary cutter and before the sharpening device to preclude contact of the sharpener with the cutter.

A still further object of the present invention is to provide a sharpener guide of the character under consideration which is adjustable through an arc of a circle whereby the cutting edge of the cutter may be covered in predetermined fashion to prevent contact with the sharpening device.

Other and further objects of the present invention relate to the provision of general details of construction, arrangement and combination of parts for attaining the results sought by the foregoing objects.

The invention consists of the novel construction hereinafter described and finally claimed.

The nature, characteristic features and scope of the invention will be more fully understood from the following description taken in connection with the accompanying drawings forming part hereof, and in which:

Fig. 3 is a view in central section of the device shown in Fig. 1.

Fig. 4 is a fragmentary view in section taken upon the line 4—4 of Fig. 3.

Fig. 5 is a fragmentary view in elevation illustrating the sharpening device shown in Fig. 1.

Fig. 6 is a fragmentary view in side elevation illustrating the details of construction shown in Fig. 1.

Fig. 7 is a fragmentary view in front elevation illustrating the manner of shifting the cutter guard into an out-of-pocket position.

Fig. 8 is a fragmentary view in section taken upon the line 8—8 of Fig. 7.

Fig. 9 is a view in section illustrating a detail of construction.

Fig. 10 is a view in section illustrating a modified form of operating the rotary cutter.

Figure 1:
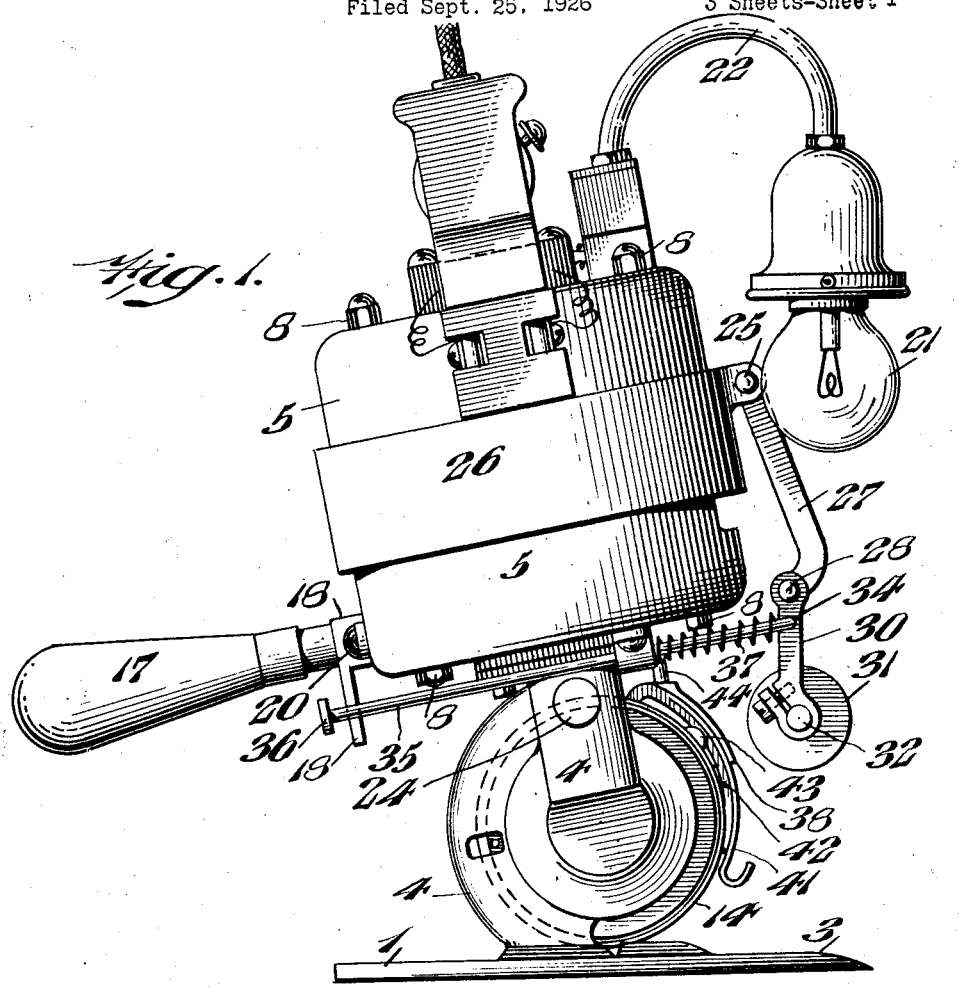
Fig. 1 is a view in side elevation of a cutting machine embodying the features of the invention.
Figure 2:
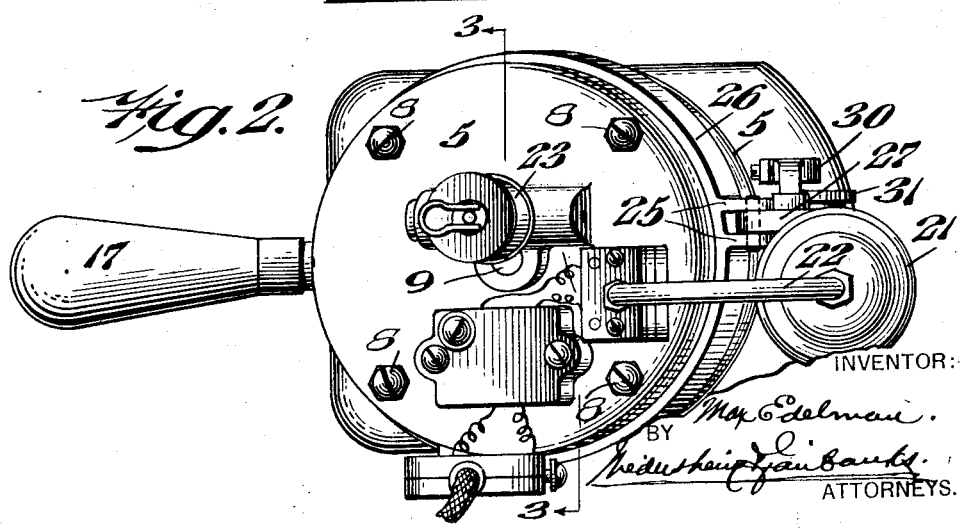
Fig. 2 is a top or plan view thereof.

For the purpose of illustrating my invention I have shown in the accompanying drawings two forms thereof which are at present preferred by me, since the same have been found in practice to give satisfactory and reliable results, although it is to be understood that the various instrumentalities of which my invention consists can be variously arranged and organized, and that my invention is not limited to the precise arrangement and organization of the instrumentalities as herein shown and described.

Referring to the drawings in detail, the reference numeral 1 designates the base of the cutting machine and provided at its forward end with a bevelled portion 3, as is customary in conventional cutting machines. Arising from the base 1 and preferably formed integral therewith is a standard 4 arranged to receive a casing 5 containing an electrical motor 6. The motor 6 is horizontally arranged, or in other words, in parallelism with the base 1, and is provided with a vertically arranged shaft 7, see Fig. 3. The casing 5, which houses the motor 6, is clamped with respect to the standard 4 by means of bolts and nuts 8, as clearly illustrated in Fig. 3. The motor 6 is mounted upon the vertically arranged shaft 7. The shaft 7 at its upper end is provided with a bearing 9 of phosphorous bronze fitted to the casing 5 and the lower end of the shaft 7 is rotatable in a bearing 10 carried by the standard 4. The lower end of the shaft 7, as shown in Fig. 3, is provided with a bevel pinion 11 adapted to mesh with the bevel gear 12, the latter being arranged to revolve upon a stud 13 fixed to standard 4, it being understood that there is fixed to stud 13 a sleeve 15 upon which is adapted to revolve gear wheel 12 which carries cutter 14, the cutter being locked with respect to the gear wheel by means of a nut 16. Thus, horizontal, rotary movement of motor 6 imparts vertical rotary movement to cutter 14. The motor and its complemental cutter are guided with respect to material to be cut by means of the handle 17. This handle 17, in practice is threadedly secured to a vertical plate 18 provided with a plurality of openings 19 to permit of the vertical adjustment of handle 17. The motor casing 5 is provided with an incandescent lamp 21 detachably carried by a bracket 22. The main vertical driving shaft 7 is lubricated by means of an oil cup 23. The bevel pinion 11 and bevel gear 12 are lubricated by means of an oil cup 24, best seen in Fig. 3.

To an annulus 26, mounted on the casing 5, and adapted to be revolved in a horizontal plane with respect thereto is pivotally secured the pendant link 27, the lower end of which is pivotally secured to the bifurcated member 30 as at 28. The bifurcated member has arranged between the tines thereof a pair of wheels 31, of carborundum or the like, which wheels are mounted upon a shaft 32 and are spaced apart as at 33 so that the annular edge of the cutter 14 may engage between the wheels 31 for sharpening purposes. Thus when the grinding or sharpening wheels 31 wear out in use, and it is necessary to adjust the same to eliminate the resulting play, it is merely necessary to revolve said annulus 26 with respect to the casing 5, thus again bringing one of the sharpening wheels 31 into contact with the edge of the knife to be sharpened, the second of said wheels being then adjusted locally with respect to the first of said wheels. As is obvious, this construction greatly lengthens the life of said grinding stones or wheels 31 since it permits of using either of the same until either or both of said wheels is completely consumed. Connected with one of the arms 30, as at 34, is a rod 35 having a handle 36, which rod is spring pressed as at 37. The rod 35 is guided at its free end through the member 18. Thus the sharpener 31 may be moved toward or away from the rotary cutter 14, and in this connection it may be stated that the spring 37 normally tends to keep the sharpening device away from the cutter 14. In order to positively maintain the cutter and sharpener in opposed relation, use is made of a guard consisting of a two-part member, formed upon an arc of a circle, and comprised of a member 38 carried by a rod 39 and having adjustable relation with said rod by means of a thumb nut 40. Having adjustable relation upon an arc of a circle with relation to member 38 is another member 41, slotted as at 42 and adjustable in an arc of a circle with relation to member 38, by means of a bolt and nut 43. Thus, it is possible to move member 41 circumferentially with respect to the cutter 14 by means of bolt and nut 43 in order that more or less of the cutting edge of the cutter can be maintained free of the sharpening device. In case it is desired to sharpen the rotary cutter 14, the thumb nut 40 may be loosened and the guard moved around the extension 44 of rod 39 so that the guard may be bodily moved, in an arc of a circle, entirely away from the cutting edge of the cutter. This position is shown in dotted lines in Fig. 7.

Instead of the bevel pinion and bevel gear for driving the cutter 14 as shown in Fig. 3, I may employ a worm 45 and a worm gear 46 for driving the cutter 14.

Having thus described my invention, what I claim as new and desire to secure by Letters Patent, is:

1. In a machine of the character stated, a casing, a rotary cutter, driving means for said cutter, an annulus movable in a horizontal plane about said casing, a pendant sharpening device pivotally carried by said annulus, manual means for advancing said device toward or away from said cutter, and removable guarding means for normally preventing contact of said cutter with said device.

2. In a machine of the character stated, a rotary cutter, a casing, driving means for said cutter, an annulus movable in a horizontal plane about said casing, sharpening devices pivotally carried by said annulus, manual means for advancing said sharpening devices towards or away from said cutter and removable guarding means for normally preventing contact of said cutter with said devices.

3. In a cutting machine of the character stated, a casing, a rotary cutter carried thereby, driving means for said cutter, a pendant sharpening device, an annular support carrying said sharpening device mounted on said casing and adapted to be revolved in a horizontal plane with respect thereto to adjust the position of said sharpening device, means normally to maintain said sharpening device at a distance from the edge of said cutter, a removable guard intermediate said cutter and sharpening device, means for bringing said sharpening device into engagement with said cutter when said guard is removed, and a vertically adjustable handle for manipulating said cutter.

4. In a cutting machine of the character stated, a casing, a rotary cutter carried thereby, driving means for said cutter, a pair of pendant sharpening devices, an upper annular support carrying said sharpening devices mounted on said casing and adapted to be revolved in a horizontal plane with respect thereto to adjust the position of said sharpening devices, means normally to maintain said sharpening devices at a distance from the edge of said cutter, a removable guard intermediate said cutter and sharpening devices, means for bringing said sharpening devices into sharpening engagement with both sides of the cutter after the guard has been removed, and a vertically adjustable handle for manipulating said cutter and its adjuncts.

5. In a cutting machine of the character stated, a casing, a rotary cutter carried thereby, driving means for said cutter, a pair of pendant sharpening devices, an annular support carrying said sharpening devices mounted on said casing and adapted to be revolved in a horizontal plane with respect thereto to vary the circumferential position of said sharpening devices as a unit with respect to said casing, means to adjust said sharpening devices with respect to each other, a removable guard intermediate said cutter and said sharpening devices, means for bringing said sharpening devices into sharpening engagement with both sides of the edge of said cutter after said guard is removed, and an adjustable handle for manipulating said cutter.

6. In a cutting machine of the character stated, a casing, a rotary cutter carried thereby, driving means for said cutter, pendant sharpening devices, an annular support carrying said sharpening devices mounted on said casing and adapted to be revolved with respect thereto to adjust the position of said sharpening device with respect to said cutter, a removable guard interposed between said sharpening devices and the edge of said cutter, an adjustable handle for guiding said cutter and its adjuncts, means for bringing said sharpening devices into and out of sharpening engagement with the edge of said cutter after said guard is removed, comprising a compression spring interposed between said sharpening devices and said casing normally to maintain the former at a distance from the edge of said cutter, and a rod secured to said sharpening devices for pulling the same inwardly into sharpening engagement with the edge of said cutter against the tension of said spring.

7. In a cutting machine of the character stated, an annulus rotatably mounted thereon, a pendant link pivotally secured to said annulus, a pendant member pivotally suspended from said link, a plurality of sharpening wheels carried by said pendant member, a rotary cutter, and means for manually actuating said sharpening wheels towards and away from said cutter.

MAX EDELMAN.